Patented Jan. 19, 1937

2,068,631

UNITED STATES PATENT OFFICE 2,068,631

PREPARATION OF CELLULOSE XANTHATE SOLUTIONS

George A. Richter, Berlin, N. H., assignor to Brown Company, Berlin, N. H., a corporation of Maine No Drawing. Application August 28, 1935, Serial No. 38,261

8 Claims. (Cl. 260—100)

This invention relates to the preparation of cellulose xanthate solutions or viscose syrups more particularly by a one-step xanthating operation performed by bringing together the cellulose fiber used as raw material and the xanthating ingredients, that is, the water, caustic soda, and carbon bisulphide calculated as necessary for the xanthate solution to be realized, for instance, solutions of a cellulose and caustic soda content each falling within the range of about 6% to 10% by weight of the solution, that is, of all the ingredients used in its preparation.

In preparing xanthate solutions by such a one-step xanthating operation, it is sometimes desirable to use mercerized cellulose fiber, that is, cellulose fiber which has undergone purification in caustic soda solutions of mercerizing activity and has been washed free of mercerizing liquor and dissolved impurities preparatory to xanthation. I have observed, however, that cellulose fiber thus purified is sluggish in its reaction with the xanthating ingredients in a one-step xanthating operation and that this sluggishness is especially noticeable when the mercerized and washed fiber is dried preparatory to admixture with the xanthating ingredients. It is apparently the case that, when mercerized fiber is washed and dried, considerable shrinkage and densification of the fiber wall ensues, in consequence of which the activity of the fiber toward the xanthating ingredients in the one-step xanthating operation, including caustic soda solution of the strength necessary to lead to xanthate solutions of 6% to 10% causticity, is markedly lower than otherwise. The lowered activity of the fiber toward the xanthating ingredients arises when the fiber is merely mercerized and washed and is accentuated when the washed fiber is dried preparatory to the one-step xanthation. Indeed, the lowered reactivity of the washed and dried mercerized fiber may be such as to militate against the securement of the desired substantially complete xanthation of such fiber in a one-step xanthating operation even though xanthation is carried out in special mixing equipment designed to effect intimate and intensive mixing action on the reacting ingredients. In some such instances, the xanthating reaction may stop at a stage whereat the partially xanthated mass contains so much residual unxanthated cellulose that the mass cannot even be filtered satisfactorily. The use of dilute or weak acid solutions, such as sulphurous acid solutions, toward the end stages of washing or after washing of the mercerized fiber for the purpose of neutralizing alkali residues, followed by a second washing operation to remove acid solutions and the products of neutralization does not help matters, for I have found that such neutralization of the washed, mercerized fiber renders the fiber time and again even more refractory toward a subsequent one-step xanthating operation than when the neutralizing treatment is omitted.

I have now found that if washed mercerized cellulose fiber is retreated either in wet or dry condition with caustic soda solution of mercerizing activity and then diluted with water to the causticity at which the one-step xanthating reaction can be effected satisfactorily, for instance, to a causticity of about 6% to 10%, based on the weight of the resulting xanthate solution, it is possible to do away with the passivity toward the xanthating reagents previously acquired by the fiber. Apparently, the reactivation of the fiber arises from the swelling action of the mercerizing caustic soda solution used in the retreatment on the shrunken or densified fiber and the tendency for fibers to remain swollen and reactivated when, rather than washing the mercerizing solution therefrom, the solution is merely diluted to the extent necessary to permit a substantially full consummation of the one-step xanthating reaction.

Various embodiments of the practice of the present invention are possible; and I shall hence simply indicate typical practices such as may be adopted to good advantage. Thus, I may start with dry mercerized wood pulp in sheet form, for instance, sheets which have undergone the purifying action of mercerizing caustic soda solution of about 18% or greater strength at room temperature (18° C.), then washed free of mercerizing solution, and dried. Sheets of various kinds of wood pulp, for instance, sulphite pulp, may be kept in contact with the mercerizing solution for a sufficient period of time preparatory to washing to be purified to an alpha cellulose content of, say, about 93% to 98%. Sheets of cotton or other cellulose fibers may similarly be rid of resins, waxes, and other impurities that detract from the qualities desired in a finished viscose solution such as may be designed for spinning into artificial silk or for casting into pellicles of regenerated cellulose. The dried, previously washed sheets of purified and mercerized cellulose fiber may then be submersed in a second mercerizing solution, for instance, caustic soda solution of about 18% or greater strength, at room temperature or in caustic soda solution of slightly lower causticity at somewhat lower temperatures and be permitted to remain in such solution for, say, twenty to forty minutes, at the end of which time the sheets are substantially uniformly saturated with the solution and their fibers adequately swollen and reactivated for the one-step xanthating reaction. The sheets may then be removed from the mercerizing solution and caustic soda solution removed therefrom, as by squeezing or centrifuging operations, to leave therein a predetermined amount of caustic soda designed to yield a finished xanthate solution of a cellulose and caustic soda content of about 6% to 10% each, based on the weight of the xanthate solution. Thus, the sheets may be squeezed to a point where they contain 18% caustic soda and 18% cellulose. They may then be placed in the xanthating vessel, which is preferably equipped with means for intimately mixing the reacting ingredients and also with a jacket through which may be passed cooling water or other medium for controlling the temperature of the reacting ingredients, and mixed in such vessel with sufficient water to yield a finished xanthate solution of, say, 8% to 10% cellulose and caustic soda content each, based on the weight of the xanthate solution, which amount of diluting water brings the causticity of the caustic soda solution associated with the cellulose to well below mercerizing strength. To the xanthating vessel containing the resulting thick suspension of cellulose fiber in caustic soda solution of non-mercerizing strength may then be added about 30% to 40% of liquid carbon bisulphide, based on the dry weight of cellulose; and the mixed ingredients may then be completely confined in the vessel and allowed to react with good mixing or churning action, preferably at about 15° C., until the reaction is substantially complete, say, for about two to four hours. The resulting solution is practically free from residual or unreacted cellulose and, after the desired dilution thereof with water and, if need be, ripening treatment, may be used for such purposes as the manufacture of artificial silk and pellicles of regenerated cellulose, the sizing of papers and fabrics, etc.

The process of the present invention may be performed as a whole on aqueous suspensions of cellulose fiber rather than on sheets. Thus, preliberated wood pulp, such as sulphite pulp, may be admixed in wet thickened condition as produced in a pulp mill with a purifying liquor of mercerizing activity, washed free of the mercerizing liquor and the impurities dissolved therein, then admixed with caustic soda solution of sufficient strength to yield a caustic soda-cellulose mixture of the appropriate caustic soda and cellulose content, for instance, 18% each, to yield directly in the xanthating vessel in the presence of added diluting water and liquid carbon bisulphide a finished xanthate solution of the desired composition, namely, one of 6% cellulose and caustic soda content each, based on the weight of the xanthate solution. Of course, the purified fiber should be permitted to remain in contact with the mercerizing solution used in the retreatment sufficiently long to be reactivated preparatory to diluting such mercerizing solution to non-mercerizing activity in the xanthating vessel. Xanthation may be carried out under the conditions already described.

The initial mercerizing or purifying treatment, which is followed by washing, may be carried out under various conditions, for instance, under conditions designed to yield a purified, mercerized fiber of low solution viscosity. The addition of oxidants, such as hypochlorites, permanganates, and persulphates, to the mercerizing liquor may be desirable in that they promote a lowering of the solution viscosity of the fiber so that, despite the fact washing of the mercerizing liquor from the fiber decreases its reactivity, nevertheless the fiber is of higher reactivity than a fiber of higher solution viscosity purified under similar conditions in a mercerizing liquor lacking an oxidant. The retreatment or reactivation of the purified mercerized fiber with caustic soda solution of mercerizing strength may be continued for a long period of time, say, for some hours, as a prolonged retreatment promotes a lowering of the solution viscosity of the fiber, which latter action may be desirable, particularly when the initial purification or mercerization has not been conducted under conditions to lower the solution viscosity of the fiber to the desired final value preparatory to the xanthating reaction. In some instances, the retreatment or reactivation of the fiber with mercerizing solution may be performed while injecting air or ozone into the solution and/or in the presence of a small amount of oxidant that is consumed during the retreatment and/or has no undesirable effect upon the resulting xanthate solution. Thus, the mercerizing solution used in the retreatment may have added thereto sodium peroxide, hydrogen peroxide, or a sufficiently small amount of hypochlorite, persulphate, or other oxidant to be consumed during the retreatment and to promote a lowering of the solution viscosity of the fiber to the desired final value preparatory to the xanthating reaction. Various kinds of wood pulp, such as sulphite, kraft, soda, etc., may undergo the two mercerizing treatments of the present invention either in the unbleached or bleached state; and other cellulose fibers, such as cotton, or cellulose pulps derived from raw cellulosic materials other than wood may be similarly processed.

I claim:—

1. A process which comprises purifying cellulose fiber in a caustic soda solution of mercerizing activity, washing the fiber substantially free from such solution, retreating the washed fiber with a caustic soda solution of mercerizing activity, adding diluting water, and reacting the retreated fiber while associated with sufficient caustic soda of said retreating solution and in the presence of sufficient added diluting water and liquid carbon bisulphide to yield in a single mixing step a cellulose xanthate solution of a cellulose and caustic soda content each falling within the range of about 6% to 10%, based on the weight of the xanthate solution.

2. A process which comprises purifying cellulose fiber in a caustic soda solution of mercerizing activity, washing the fiber substantially free from such solution, retreating the washed fiber for at least about twenty minutes with a caustic soda solution of mercerizing activity, adding diluting water and reacting the retreated fiber while associated with sufficient caustic soda of said retreating solution and in the presence of sufficient added diluting water and liquid carbon bisulphide to yield in a single mixing step a cellulose xanthate solution of a cellulose and caustic soda content each falling within the range of about 6% to 10%, based on the weight of the xanthate solution.

3. A process which comprises purifying cellulose fiber in a caustic soda solution of mercerizing activity, washing the fiber substantially free from such solution, retreating the washed fiber with caustic soda solution of mercerizing activity in amount containing caustic soda far in excess of that calculated to yield in the presence of diluting water and liquid carbon bisulphide a cellulose xanthate solution of a cellulose and caustic soda content each falling within the range of about 6% to 10%, based on the weight of the xanthate solution, removing from the retreated fiber substantially only that amount of retreating solution containing the excess caustic soda, adding diluting water, and reacting the resulting mixture of fiber and caustic soda solution in the presence of sufficient added diluting water and liquid carbon bisulphide to yield in a single mixing step a cellulose xanthate solution of a cellulose and caustic soda content each falling within the range of about 6% to 10%, based on the weight of the xanthate solution.

4. A process which comprises purifying cellulose fiber in a caustic soda solution of mercerizing activity, washing the fiber substantially free from such solution, retreating the washed fiber for at least about twenty minutes with caustic soda solution of mercerizing activity in amount containing caustic soda far in excess of that calculated to yield in the presence of diluting water and liquid carbon bisulphide a cellulose xanthate solution of a cellulose and caustic soda content each falling within the range of about 6% to 10%, based on the weight of the xanthate solution, removing from the retreated fiber substantially only that amount of retreating solution containing the excess caustic soda, adding diluting water, and reacting the resulting mixture of fiber and caustic soda solution in the presence of sufficient added diluting water and liquid carbon bisulphide to yield in a single mixing step a cellulose xanthate solution of a cellulose and caustic soda content each falling within the range of about 6% to 10%, based on the weight of the xanthate solution.

5. A process which comprises purifying cellulose fiber in a caustic soda solution of mercerizing activity, washing the fiber substantially free from such solution, associating with the washed fiber caustic soda solution of mercerizing activity in amount calculated to yield in the presence of diluting water and liquid carbon bisulphide a cellulose xanthate solution of a cellulose and caustic soda content each falling within the range of about 6% to 10%, based on the weight of the xanthate solution, adding diluting water and reacting such fiber-caustic soda mixture in the presence of sufficient added diluting water and liquid carbon bisulphide to yield in a single mixing step a cellulose xanthate solution of a cellulose and caustic soda content each falling within the range of about 6% to 10%, based on the weight of the xanthate solution.

6. A process which comprises associating with dried, substantially alkali-free mercerized cellulose fiber caustic soda solution of mercerizing activity in amount calculated to yield in the presence of diluting water and liquid carbon bisulphide a cellulose xanthate solution of a cellulose and caustic soda content each falling within the range of about 6% to 10%, based on the weight of the xanthate solution, adding diluting water, and reacting such fiber-caustic soda mixture in the presence of sufficient added diluting water and liquid carbon bisulphide to yield in a single mixing step a cellulose xanthate solution of a cellulose and caustic soda content each falling within the range of about 6% to 10%, based on the weight of the xanthate solution.

7. A process which comprises treating dried, substantially alkali-free mercerized cellulose fiber with caustic soda solution of mercerizing activity, adding diluting water, and reacting the resulting fiber while associated with sufficient caustic soda of said treating solution and in the presence of sufficient added diluting water and liquid carbon bisulphide to yield in a single mixing step a cellulose xanthate solution of a cellulose and caustic soda content each falling within the range of about 6% to 10%, based on the weight of the xanthate solution.

8. A process which comprises treating dried, substantially alkali-free mercerized cellulose fiber with caustic soda solution of mercerizing activity in amount containing caustic soda far in excess of that calculated to yield in the presence of diluting water and liquid carbon bisulphide a cellulose xanthate solution of a cellulose and caustic soda content each falling within the range of about 6% to 10%, based on the weight of the xanthate solution, removing from the treated fiber substantially only that amount of treating solution containing the excess caustic soda, adding diluting water and reacting the resulting mixture of fiber and caustic soda solution in the presence of sufficient added diluting water and liquid carbon bisulphide to yield in a single mixing step a cellulose xanthate solution of a cellulose and caustic soda content each falling within the range of about 6% to 10%, based on the weight of the xanthate solution.

GEORGE A. RICHTER.